(12) United States Patent  (10) Patent No.: US 7,492,487 B2
Yu  (45) Date of Patent: Feb. 17, 2009

(54) MULTI-FUNCTION PRODUCT CAPABLE OF DETECTING A SLOPE OF A SECOND FUNCTIONAL MACHINE INSTALLED ABOVE A FIRST FUNCTIONAL MACHINE

(75) Inventor: Ming-Wei Yu, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 970 days.

(21) Appl. No.: 10/610,640

(22) Filed: Jul. 2, 2003

(65) Prior Publication Data

US 2004/0184062 A1 Sep. 23, 2004

(30) Foreign Application Priority Data

Mar. 21, 2003 (TW) .............................. 92106413 A (51) Int. Cl.
*G06F 15/00* (2006.01)
(52) U.S. Cl. ...................... 358/298; 358/1.13; 358/1.15
(58) Field of Classification Search ................ 358/474, 358/406, 497, 401, 461, 504, 505, 501, 296, 358/1.13, 1.15, 494, 496, 7, 498, 298; 340/547; 335/205, 207, 280; 200/302.3; 399/379, 399/380, 405, 110; 347/85; 379/433; 359/368; 455/569; 355/3; 356/371
See application file for complete search history.

(56) References Cited

U.S. PATENT DOCUMENTS 4,671,644 A 6/1987 Sumlda et al.
4,764,016 A * 8/1988 Johansson .................... 356/602
4,992,827 A 2/1991 Kobayashi et al.
5,008,709 A 4/1991 Shinada et al.
5,115,281 A * 5/1992 Ohtsuka et al. ................ 399/16
5,420,716 A * 5/1995 Fukaya ........................ 359/368
5,673,021 A * 9/1997 Woods ........................ 340/547
6,104,808 A * 8/2000 Alameh et al. .......... 379/433.02
6,115,620 A * 9/2000 Colonna et al. .......... 455/569.1
6,157,718 A * 12/2000 Kaschke .................. 455/569.1
6,160,642 A * 12/2000 Mui et al. ..................... 358/498
7,019,870 B2 * 3/2006 Kameyama et al. ......... 358/474
7,031,036 B2 * 4/2006 Chao ........................... 358/497
2002/0145650 A1 * 10/2002 Pan et al. ...................... 347/85

FOREIGN PATENT DOCUMENTS

JP   04019166 A  *  1/1992
JP   6-74766       3/1994
JP   6-78108       3/1994

* cited by examiner

*Primary Examiner*—King Y Poon
*Assistant Examiner*—Allen H Nguyen
(74) *Attorney, Agent, or Firm*—Workman Nydegger (57) ABSTRACT

A multi-function product (MFP) includes a first functional machine having a casing, and a second functional machine having a liftable housing installed above the casing of the first functional machine, at least one sliding track inside the housing, a moving object positioned inside the housing for moving along the sliding track, and a detector for detecting the position of the moving object.

29 Claims, 8 Drawing Sheets

MULTI-FUNCTION PRODUCT CAPABLE OF DETECTING A SLOPE OF A SECOND FUNCTIONAL MACHINE INSTALLED ABOVE A FIRST FUNCTIONAL MACHINE

BACKGROUND OF INVENTION

1. Field of the Invention

The present invention relates to a multi-function product (MFP), and more specifically, to an MFP capable of detecting a slope of a second functional machine installed above a first functional machine.

2. Description of the Prior Art

Multi-function products (MFPs) integrate various functions of typical functional machines together, such as printing, scanning, facsimile, and copy machines, so that both the cost of purchasing functional machines separately and the required storage space are reduced. MFPs have become mainstream in the market, with placement in schools, classrooms, family households, and studios, and are broadly used as an output device in today's information-oriented society.

Since an MFP is an integration of functional machines for various purposes, there are a variety of possible combinations. While operating some functions or replacing spare parts, there is an inevitable need to lift up a part of the MFP from another part of the MFP. In this situation, several specific functions cannot operate normally, causing low quality of products and possible damage to the internal parts. This is due to a lack of a security switch to prevent invalid operation, such as operating the machine before returning the lifted part to the original position.

SUMMARY OF INVENTION

It is therefore a primary objective of the present invention to provide an MFP capable of detecting a slope of a second machine installed above a first machine.

Briefly summarized, an MFP according to the present invention includes a first functional machine comprising a casing, and a second functional machine comprising a liftable housing installed above the casing of the first functional machine, at least one sliding track inside the housing, a moving object positioned inside the housing for moving along the sliding track, and a detector for detecting the position of the moving object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
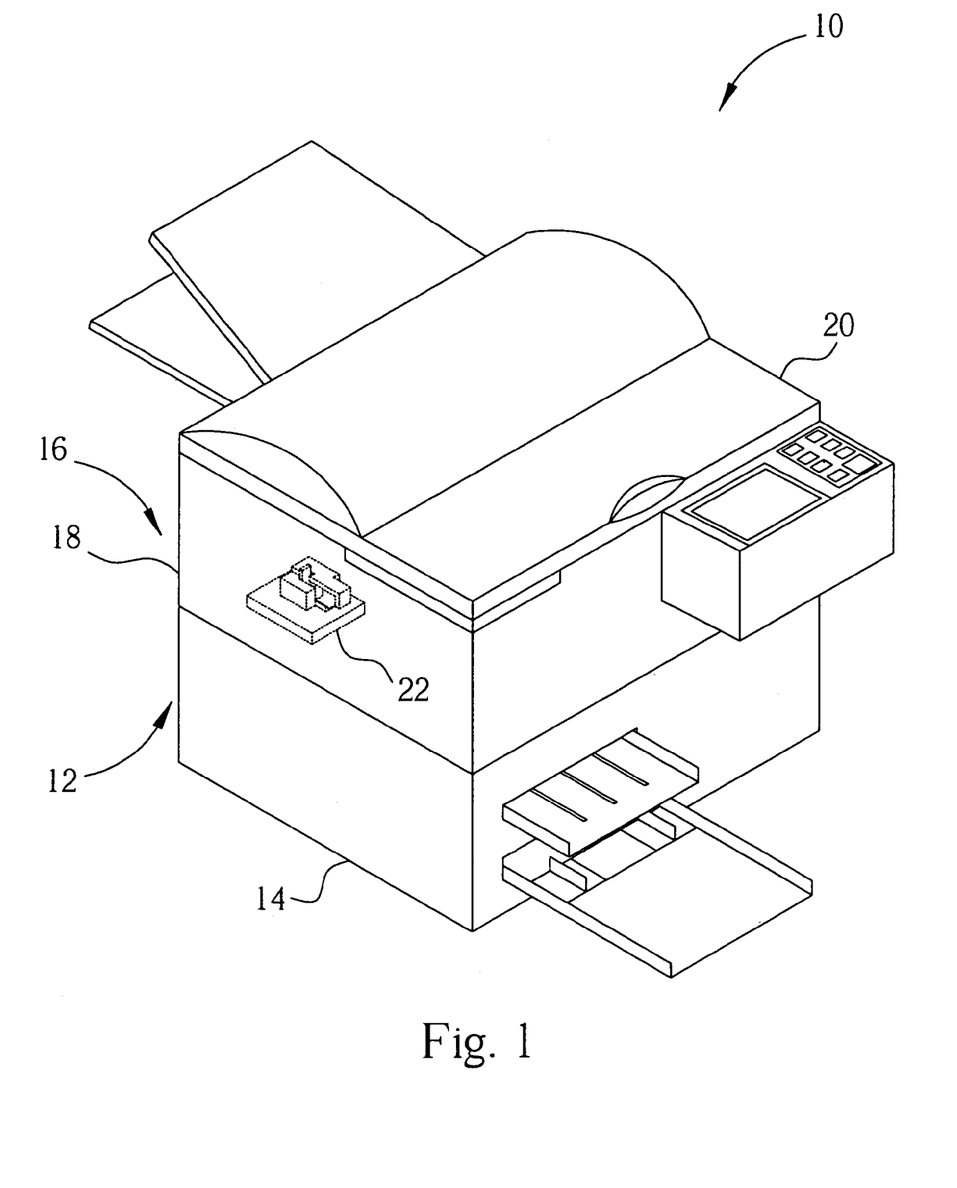
FIG. 1 is a diagram illustrating an MFP according to the present invention.
Figure 2:
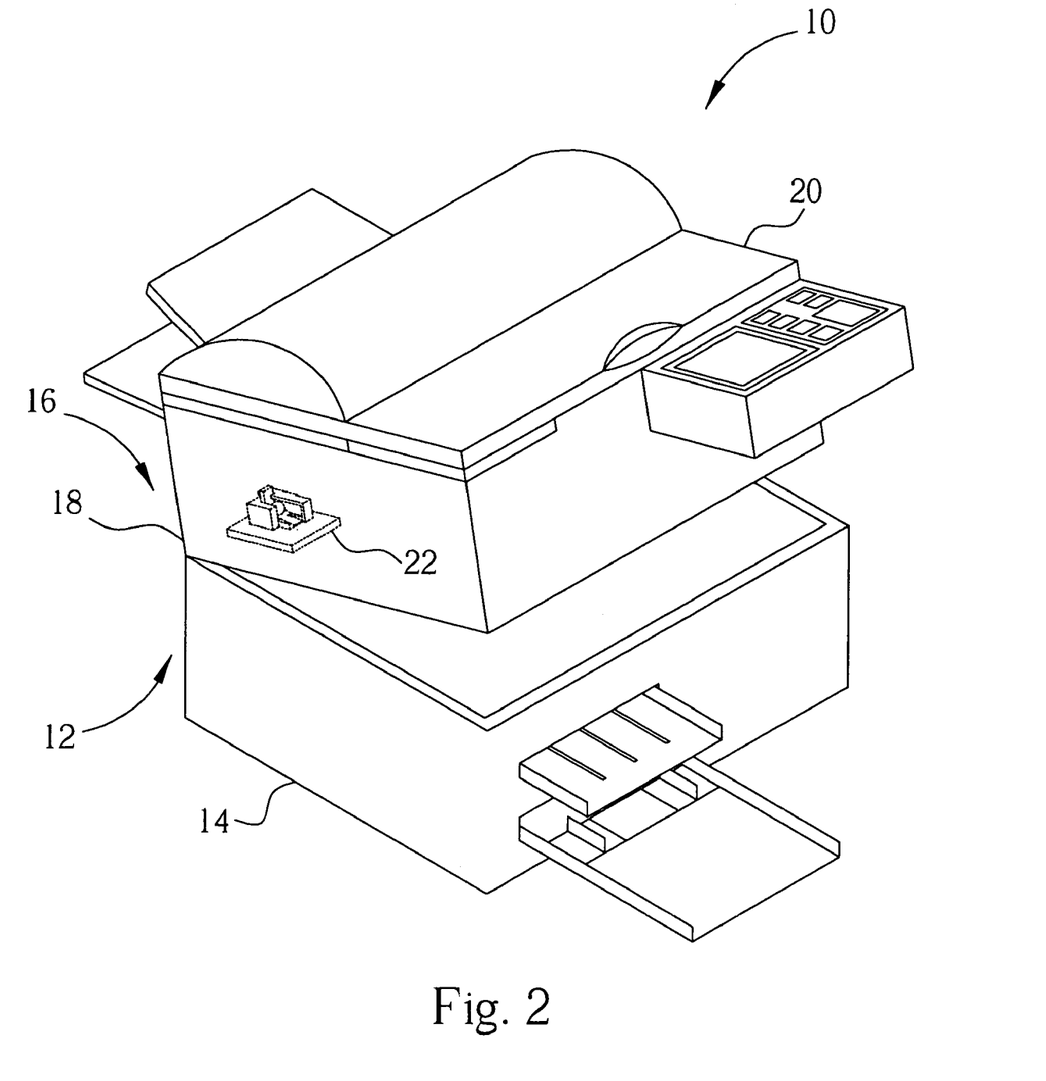
FIG. 2 is a diagram illustrating an MFP with its second functional machine lifted up.

Please refer to FIG. 1. FIG. 1 is a diagram illustrating an MFP 10 according to the present invention. The MFP 10 includes a first functional machine 12 and a second functional machine 16. The first functional machine 12 includes a casing 14. The second functional machine 16 includes a liftable housing 18 installed above the casing 14 of the first functional machine 12, a lid 20 installed above the housing 18 of the second functional machine 16, and a detector 22 for detecting whether the second functional machine 16 is level. The first functional machine 12 and the second functional machine 16 can be different machines including scanners, facsimiles, copy machines, printers, and card readers. Please refer to FIG. 2. FIG. 2 is a diagram illustrating an MFP 10 with its second functional machine 16 lifted up. The second functional machine 16 is fixed on the casing 14 of the first functional machine 12 so that it can be lifted up. While repairing or replacing parts, the second functional machine 16 is lifted up as shown in FIG. 2, and in normal condition, the second functional machine 16 is lowered down as shown in FIG. 1.

Figure 3:
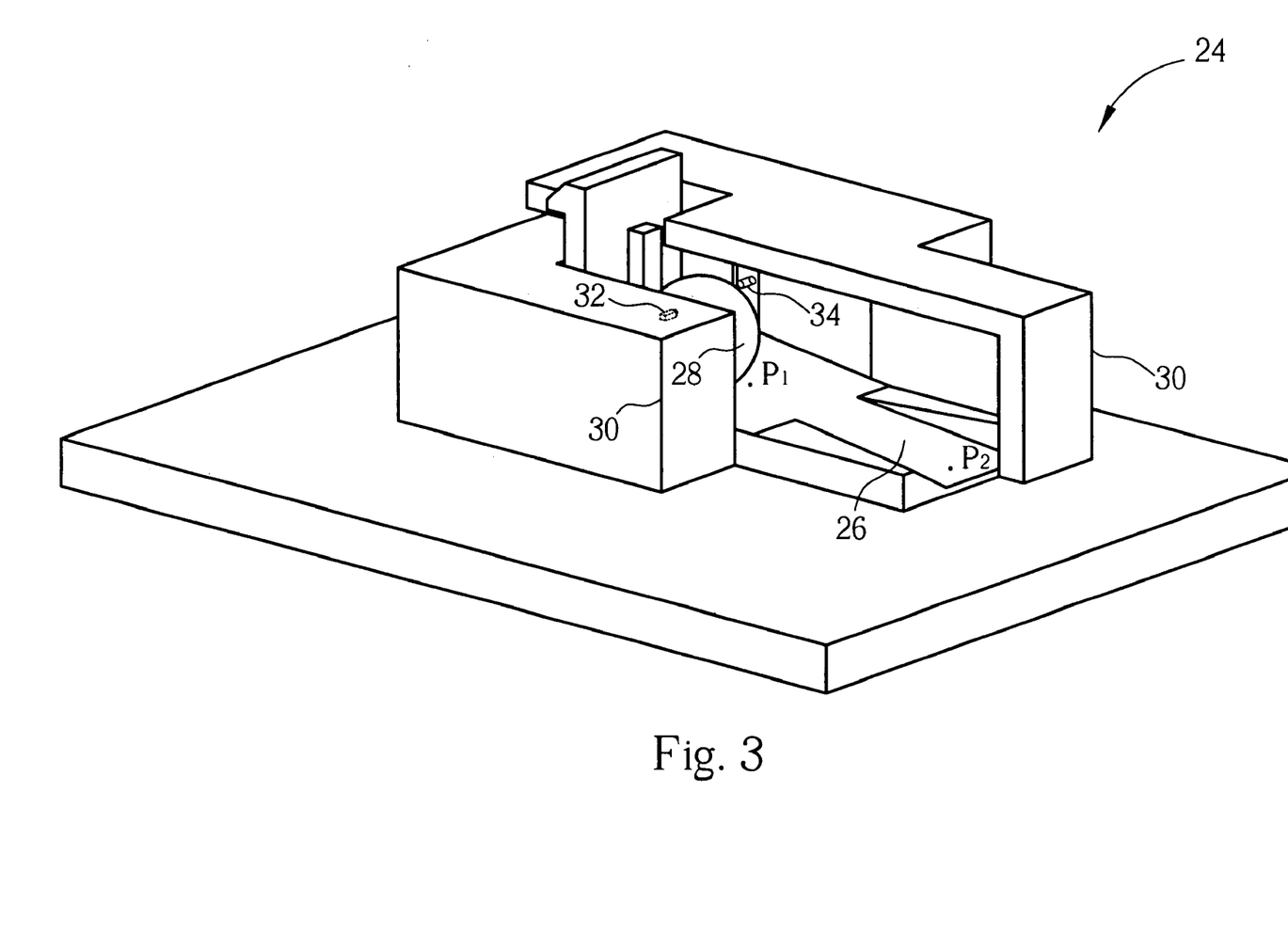
FIG. 3 is a diagram illustrating a first detector according to the present invention.

Please refer to FIG. 3. FIG. 3 is a diagram illustrating a first detector 24 according to the present invention. The first detector 24 includes a sloping ramp 26. The angle of inclination can be determined according to the purpose. For instance, if a higher sensitivity of the first detector 24 is needed, the angle can be smaller, and if a lower sensitivity is needed, the angle can be larger. The first detector 24 further includes an opaque sphere 28 on the sloping ramp 26 which can roll or slide on the sloping ramp 26, and a restricting structure 30 for restricting the moving range of the sphere 28 so that the sphere 28 can only roll or slide on the sloping ramp 26 and in the restricting structure 30, in order to keep the sphere 28 on the sloping ramp 26 from vibrating. The first detector 24 further includes a light source 32 and an optical sensor 34, which serves as an optical detecting switch. The light source 32 and the optical sensor 34 are installed on P1 of the sloping ramp 26. The light source 32 generates a ray of light and the optical sensor 34 receives the ray of light. When no object exists between the light source 32 and the optical sensor 34, the optical sensor 34 can receive the light generated by the light source 32 and the second functional machine 16 is switched on. When an object exists between the light source 32 and the optical sensor 34, the light generated by the light source 32 is blocked so that the optical sensor 34 cannot completely receive the ray of light, and the second functional machine 16 is switched off.

When the second functional machine 16 is kept level, the sphere 28 slides down to P2 of the sloping ramp 26 due to gravity. In this situation, the optical sensor 34 installed on the upper side of the sloping ramp 26 can receive the ray of light from the light source 32 to judge that the sphere 28 is on the lower side of the sloping ramp 26, and the second functional machine 16 is switched on. When the second functional machine 16 is lifted up, the sphere 28 rolls up to P1 of the sloping ramp 26. In this situation, blocked by the sphere 28, the optical sensor 34 installed on the upper side of the sloping ramp 26 cannot receive the ray of light from the light source 32, so that the optical sensor 34 judges that the sphere 28 is on the upper side of the sloping ramp 26, and the second functional machine 16 is switched off to prevent it from invalid operation.

Figure 4:
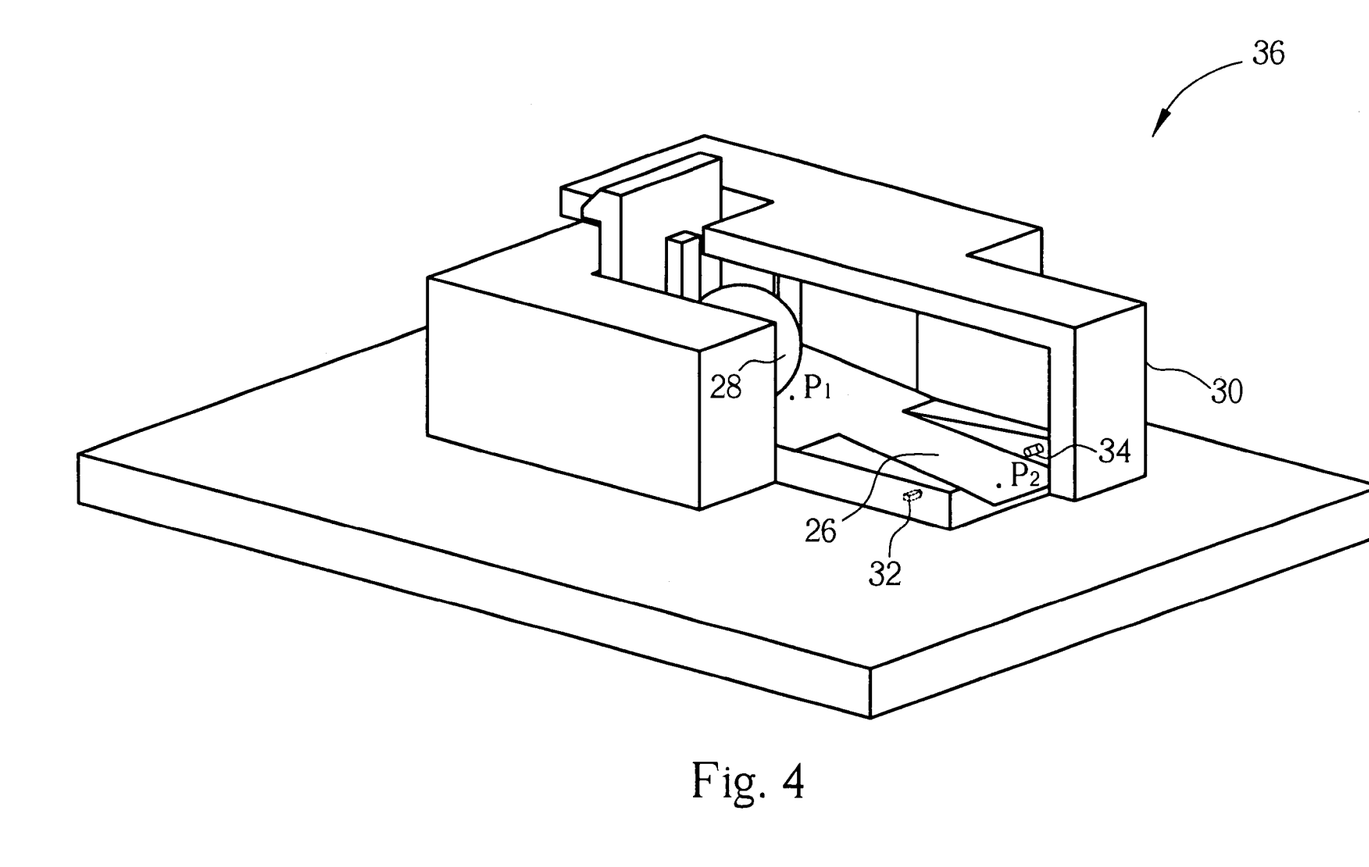
FIG. 4 is diagram illustrating a second detector according to the second embodiment of the present invention.

Please refer to FIG. 4. FIG. 4 is diagram illustrating a second detector 36 according to the second embodiment of the present invention. The second detector 36 is installed in an MFP according to the second embodiment, which is substantially the same in structure to the first detector 24 according to the first embodiment. The only difference between the two embodiments is that the light source 32 and the optical sensor 34 serving as the optical detecting switch are installed at P2 of the sloping ramp 26. When the optical sensor 34 cannot receive the ray of light from the light source 32, the second functional machine 16 is switched on, and when the optical sensor 34 can receive the ray of light from the light source 32, the second functional machine 16 is switched off.

The operation of the second detector 36 is the same to the first detector 24. When the second functional machine 16 is kept level, the sphere 28 slides down to P2 of the sloping ramp 26 due to gravity. In this situation, blocked by the sphere 28, the optical sensor 34 installed on the lower side of the sloping ramp 26 cannot receive the ray of light from the light source 32 and the second functional machine 16 is switched on. When the second functional machine 16 is lifted up, the sphere 28 rolls up to P1 of the sloping ramp 26. In this situation, the optical sensor 34 installed on the lower side of the sloping ramp 26 can receive the ray of light from the light source 32 and the second functional machine 16 is switched off to prevent it from invalid operation.

Figure 5:
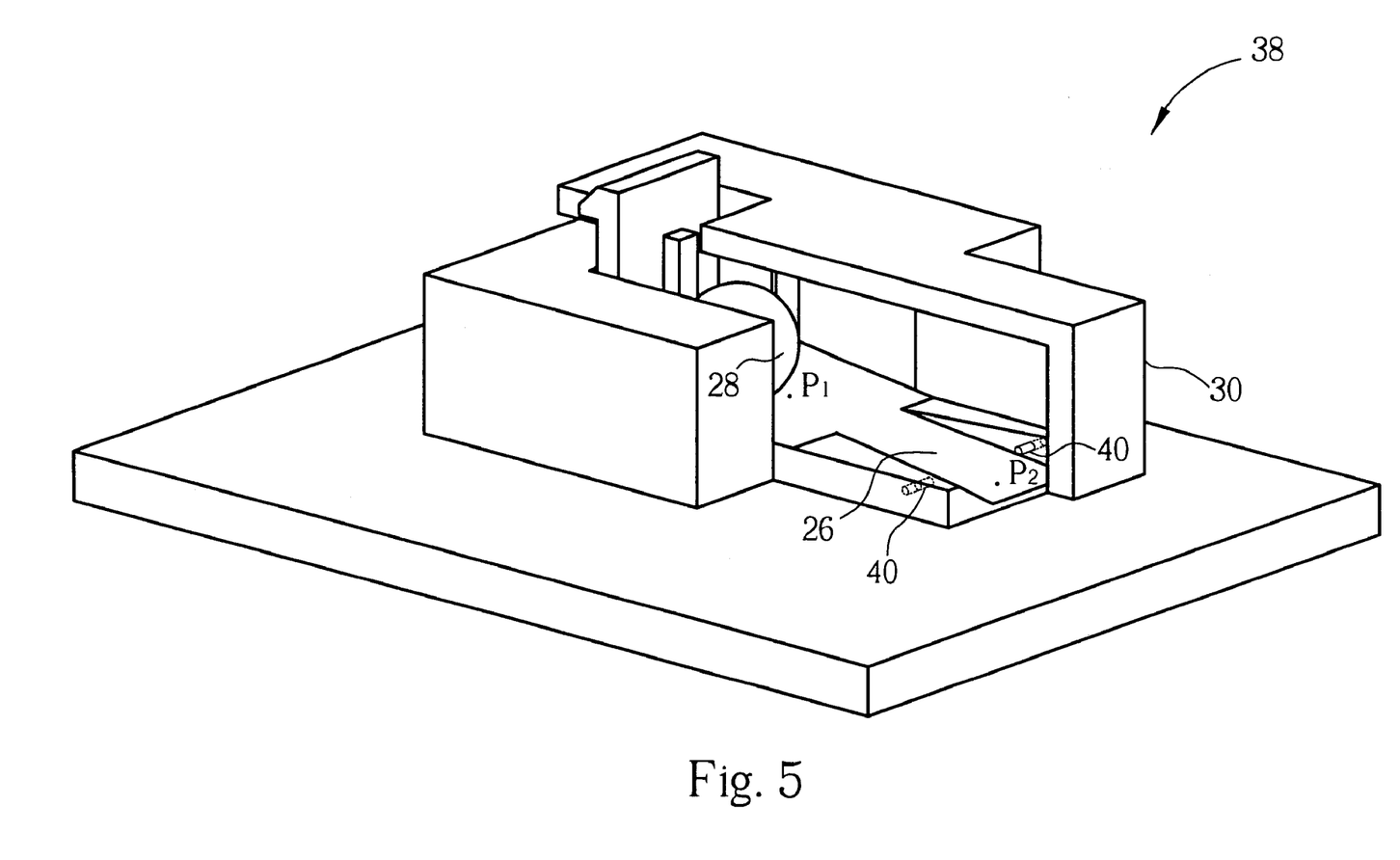
FIG. 5 is diagram illustrating a third detector according to the third embodiment of the present invention.

Please refer to FIG. 5. FIG. 5 is diagram illustrating a third detector 38 according to the third embodiment of the present invention. The third detector 38 is installed in an MFP according to the third embodiment, which is substantially the same in structure to the first detector 24 according to the first embodiment. The only difference between the two embodiments is that the third detector 38 is composed of two bars 40 installed on P2 of the sloping ramp 26. The bars 40 draw back into the restricting structure 30 when pressed, so that the second functional machine 16 is switched on. Alternatively, when the bars 40 are not pressed, the second functional machine 16 is switched off.

Figure 6:
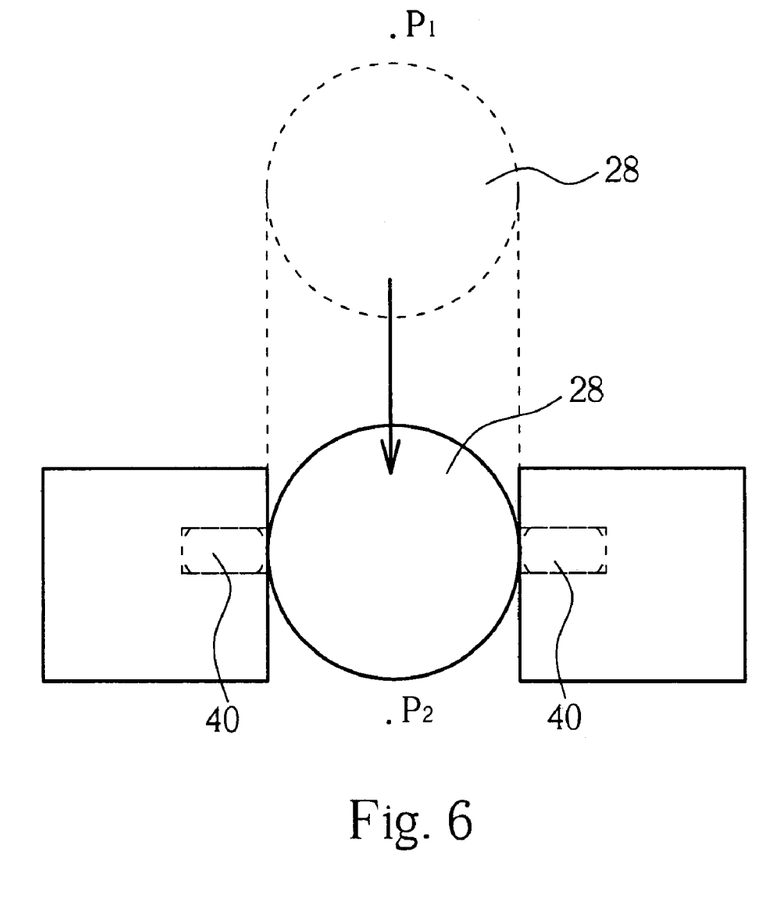
FIG. 6 is a diagram illustrating two bars pressed by a sphere on P2 of a third detector.
Figure 7:
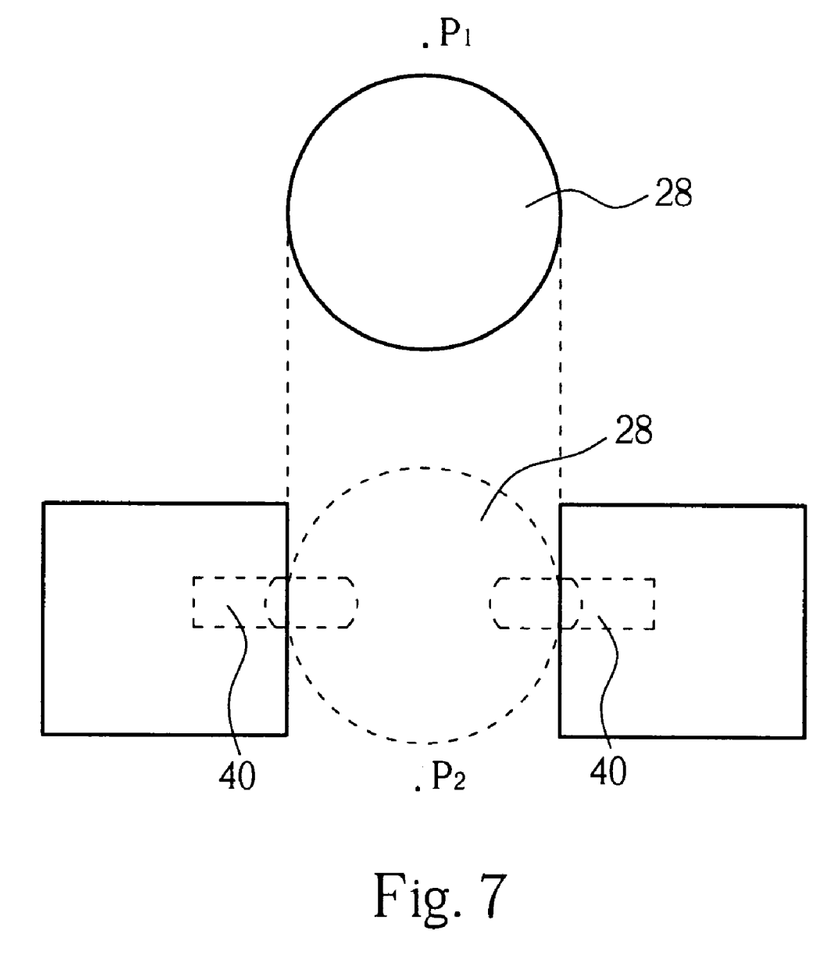
FIG. 7 is a diagram illustrating two bars not being pressed on P1 of a third detector 38.

Please refer to FIG. 6 and FIG. 7. FIG. 6 is a diagram illustrating two bars pressed by a sphere 28 on P2 of the sloping ramp 26 of the third detector 38. When the second functional machine 16 is kept level, the sphere 28 slides down to P2 of the sloping ramp 26 due to gravity. In this situation, the bars 40 are pressed by the sphere 28 and draw back into the restricting structure 30 and the second functional machine 16 is switched on. When the second functional machine 16 is lifted up, the sphere 28 rolls up to P1 of the sloping ramp 26. In this situation, the bars 40 are not pressed, and the second functional machine 16 is switched off to prevent it from invalid operation.

Similarly, the bars 40 can be installed on P1 of the sloping ramp 26. In this situation, the second functional machine 16 is switched off when the bars 40 are pressed, and is switched on when the bars 40 are not pressed. The operation is the same to the third detector 38, so that a further description is hereby omitted.

Figure 8:
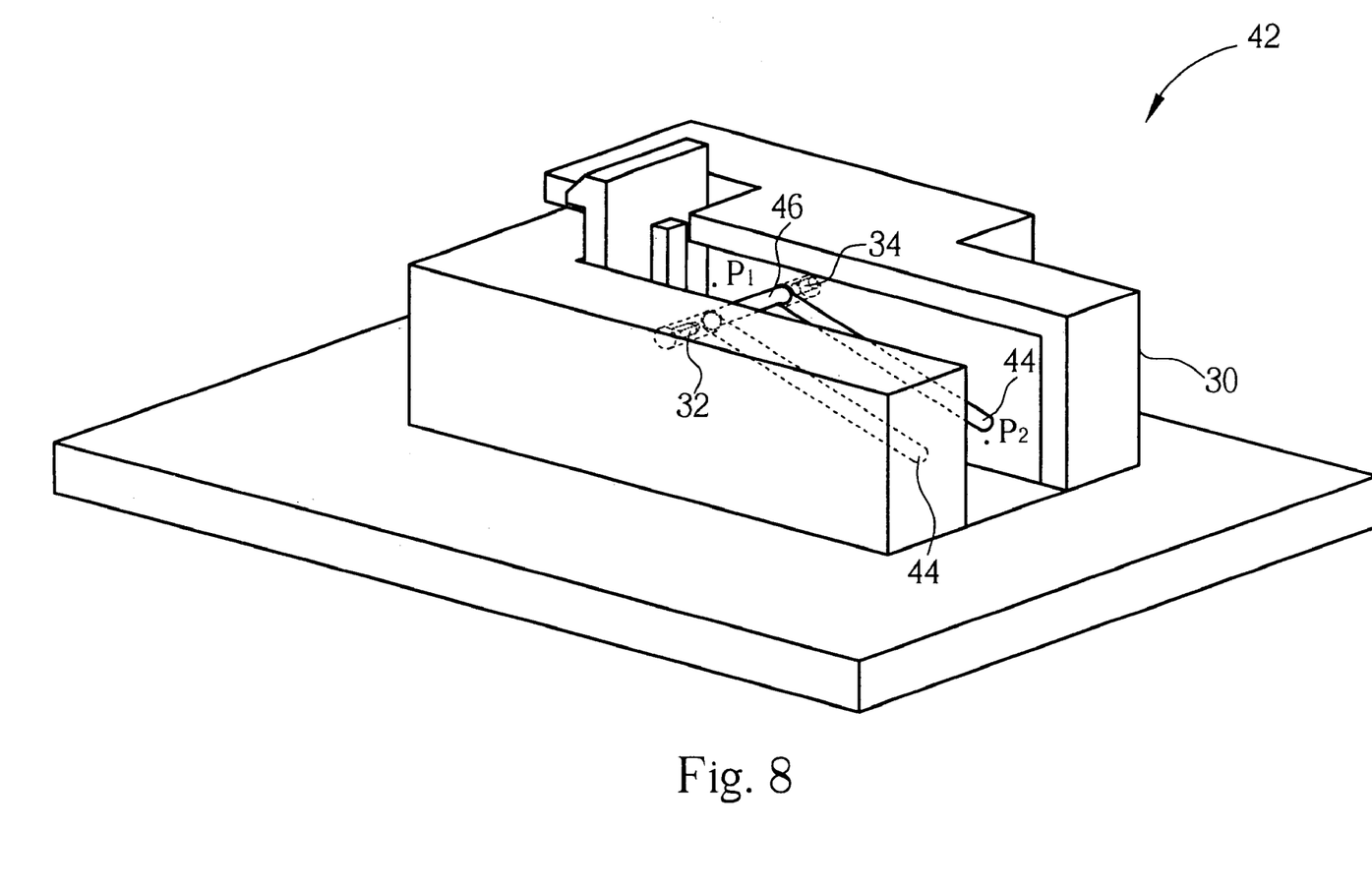
FIG. 8 is diagram illustrating a fourth detector according to the fourth embodiment of the present invention.

Please refer to FIG. 8. FIG. 8 is a diagram illustrating a fourth detector 42 according to the fourth embodiment of the present invention. The fourth detector 42 is installed in an MFP according to the fourth embodiment, which includes two sloping grooves 44 installed in the restricting structure 30 with its angle of inclination determined according to the purpose, an opaque axial shaft 46 with its two ends positioned in the sloping grooves 44 to move along the sloping grooves 44, the restricting structure 30 for restricting the moving range of the axial shaft 46, and the light source 32 and the optical sensor again serve as an optical detecting switch. The light source 32 and the optical sensor 34 are installed in the restricting structure 30 and positioned on P1 of the sloping grooves 44. The light source 32 generates a ray of light and the optical sensor 34 receives the ray of light. When no object exists between the light source 32 and the optical sensor 34, the light generated by the light source 32 can be received by the optical sensor 34 and the second functional machine 16 is switched on. When an object exists between the light source 32 and the optical sensor 34, the ray of light generated by the light source 32 is blocked so that the optical sensor 34 cannot completely receive the ray, and the second functional machine 16 is switched off.

When the second functional machine 16 is kept level, the axial shaft 46 slides down to P2 of the sloping grooves 44 due to gravity. In this situation, the optical sensor 34 installed on the upper side of the sloping grooves 44 can receive the ray of light from the light source 32 to judge that the axial shaft 46 is at P2 of the sloping grooves 44, and the second functional machine 16 is switched on. When the second functional machine 16 is lifted up, the axial shaft 46 slides up to P1 of the sloping grooves 44. In this situation, blocked by the axial shaft 46, the optical sensor 34 installed on the upper side of the sloping ramp 26 cannot receive the ray of light from the light source 32, so that the optical sensor 34 judges that the axial shaft 46 is at P1 of the sloping grooves 44 and the second functional machine 16 is switched off to prevent it from invalid operation.

Additionally, the light source 32 and the optical sensor 34 can be installed at P2 of the sloping grooves 44. In this situation, the second functional machine 16 is switched off when the optical sensor 34 receives the ray of light from the light source 32, and is switched on when the optical sensor 34 does not receive the ray of light from the light source 32. The operation is the same to the fourth detector 42, so that a further description is hereby omitted.

In contrast to the prior art, the MFP according to the present invention is capable of detecting a slope to judge whether a second functional machine is level or lifted up, in order to switch on and switch off the functional machines at the right moment in order to protect the MFP from invalid operation. Additionally, the detector according to the present invention is highly efficient, cost-saving, and environment-caring, so that it is suitable for precise and low-cost equipment such as MFPs.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A multi-function product (MFP) comprising:
   a first functional machine comprising a casing; and
   a second functional machine comprising:
   a liftable housing installed above the casing of the first functional machine;
   at least one sliding track inside the housing;
   a moving object positioned inside the housing for moving along the sliding track; and
   a detector for detecting the position of the moving object.

2. The MFP of claim 1 wherein the detector comprises a light source and an optical sensor.

3. The MFP of claim 1 wherein the detector comprises a light source and a contact sensor.

4. The MFP of claim 1 wherein the detector is installed on a first end of the sliding track, and the detector can detect the moving object when the housing of the second functional machine is lifted up.

5. The MFP of claim 1 wherein the detector is installed on a second end of the sliding track, and the detector can detect the moving object when the housing of the second functional machine is lowered down.

6. The MFP of claim 1 wherein the sliding track is a sloping ramp.

7. The MFP of claim 6 wherein the moving object is an opaque spherical ball.

8. The MFP of claim 1 wherein the second functional machine comprises two sliding tracks which are two sloping grooves.

9. The MFP of claim 8 wherein the moving object comprises an axial shaft with two ends positioned in the sloping grooves for moving along the sloping grooves.

10. The MFP of claim 1 wherein the second functional machine comprises a lid installed above the housing of the second functional machine.

11. The MFP of claim 1 wherein the second functional machine comprises a restricting structure used to restrict the moving range of the moving object.

12. The MFP of claim 1 wherein the first functional machine is a printing machine.

13. The MFP of claim 1 wherein the first functional machine is a scanning machine.

14. The MFP of claim 1 wherein the first functional machine is a facsimile machine.

15. The MFP of claim 1 wherein the first functional machine is a copy machine.

16. The MFP of claim 1 wherein the second functional machine is a printing machine.

17. The MFP of claim 1 wherein the second functional machine is a scanning machine.

18. The MFP of claim 1 wherein the second functional machine is a facsimile machine.

19. The MFP of claim 1 wherein the second functional machine is a copy machine.

20. An apparatus, comprising:
a casing including a first functional unit; and
a housing coupled to the casing, wherein the housing is capable of being moved at least in part with respect to the casing, and wherein the housing comprises:
a second functional unit, and
a position detector disposed on the housing comprising a moving object adapted to move from a first position to a second position as the housing is moved with respect to the casing such that the position detector is configured to detect the position of the moving object to determine whether the housing is moved at least in part with respect to the casing, wherein the position detector includes a sliding track and the moving object is capable of moving along the sliding track.

21. The apparatus of claim 20, wherein the position detector is configured to detect whether the housing is moved at least in part with respect to the casing such that the second functional unit can be turned off in response to a detection that the housing has moved at least in part with respect to the casing.

22. The apparatus of claim 21, wherein the second functional unit is capable of being automatically turned off in response to the detection that the housing has moved at least in part with respect to the casing.

23. The apparatus of claim 20, wherein the housing is capable of pivoting relative to the casing.

24. The apparatus of claim 20, wherein the position detector comprises a light source and an optical sensor.

25. The apparatus of claim 21, wherein the moving object comprises an opaque spherical ball.

26. The apparatus of claim 20, wherein the first functional unit comprises a printer.

27. The apparatus of claim 20, wherein the second functional unit comprises a scanner.

28. A method, comprising:
determining whether a housing including a second functional unit is moved at least in part with respect to a casing including a first functional unit wherein said determining comprises sensing that a moveable object located on the housing has moved from a first position to a second position, and wherein said determining comprises sensing that the moveable object is substantially preventing light from reaching a light sensor; and
disabling the second functional unit in response to a determination that the housing is moved at least in part with respect to the casing.

29. The method of claim 28, wherein said disabling the second functional unit comprises automatically disabling the second functional unit in response to a determination that the housing is moved at least in part with respect to the casing.

* * * * *

UNITED STATES PATENT AND TRADEMARK OFFICE
CERTIFICATE OF CORRECTION

PATENT NO. : 7,492,487 B2  Page 1 of 1
APPLICATION NO. : 10/610640
DATED : February 17, 2009
INVENTOR(S) : Ming-Wei Yu It is certified that error appears in the above-identified patent and that said Letters Patent is hereby corrected as shown below:

Title Page,
Item 56, References Cited, U.S. Patent Documents, change "4,671,644 A 6/1987 Sumlda et al." to --4,671,644 A * 6/1987 Sumida et al. ............... 399/124--

Signed and Sealed this

Thirtieth Day of June, 2009

JOHN DOLL
*Acting Director of the United States Patent and Trademark Office*